United States Patent [19]
Glaser

[11] Patent Number: 4,797,041
[45] Date of Patent: Jan. 10, 1989

[54] CHUCK

[75] Inventor: Franz Glaser, Nuremberg, Fed. Rep. of Germany

[73] Assignee: Hertel AG Werkzeuge & Hartstoffe, Fürth, Fed. Rep. of Germany

[21] Appl. No.: 137,151

[22] Filed: Dec. 23, 1987

[30] Foreign Application Priority Data

Dec. 23, 1986 [DE] Fed. Rep. of Germany ....... 3644091
May 20, 1987 [DE] Fed. Rep. of Germany ....... 3716932
Oct. 14, 1987 [DE] Fed. Rep. of Germany ....... 3734699

[51] Int. Cl.$^4$ ............................................. B23C 1/00
[52] U.S. Cl. ................................ 409/232; 408/239 R
[58] Field of Search ................. 409/234, 232; 279/75, 279/9 R, 28, 34; 408/239 R; 29/38 A

[56] References Cited

U.S. PATENT DOCUMENTS 4,176,699 12/1979 Leitner ................................ 279/75
4,630,980 12/1986 Kubo ................................... 409/234

FOREIGN PATENT DOCUMENTS

204671 12/1986 European Pat. Off. .
846828 8/1960 United Kingdom .
2155823 10/1985 United Kingdom .
2164276 3/1986 United Kingdom .

Primary Examiner—Leon Scott, Jr.
Attorney, Agent, or Firm—Spencer & Frank

[57] ABSTRACT

In a chuck for clamping a tool (1) into a carrier (2), a shank (3) is provided in the tool (1) and a mating bore (4) in the carrier (2). The shank (3) is insertable into the mating bore (4) and can be fixed there. To fix it, a locking element (7) is displaceably mounted in a radial transverse recess (6) of the shank (3) and its two front ends are provided with planar slopes (9, 10). Both slopes (9, 10) form an acute angle (11) which closes in the direction toward the tool (1). The chuck is tightened by means of pressure screws (15) which are screwed radially into an annular flange (12) of carrier (2) surrounding bore (4). The pressure element of the pressure screws (15) is a ball (14) having a truncation surface (13) which, when positioned in the same plane, charges the opposing slope (9, 10) of the locking element (7).

27 Claims, 9 Drawing Sheets

CHUCK

BACKGROUND OF THE INVENTION

The present invention relates to a chuck having the features defined in the preamble of claim 1.

In a known chuck of the above-mentioned type (DE-C No. 1,183,341), the balls are charged by internal eccentric faces of a collet mounted on an annular flange so as to be rotatable about the system axis, thus radially inwardly clamping the balls against the locking element. This radially inwardly directed clamping pressure exerted by the balls is deflected into an axial clamping direction by the sloped faces at the frontal end of the locking element. This chuck has the drawback that the collet as well as the sloped faces of the locking element are only in point contact with the balls. This makes the chuck subject to wear and limits its resistance to vibratory influences which are unavoidable in operation.

SUMMARY OF THE INVENTION

It is an object of the invention to configure a chuck of the above-mentioned type so that it is resistant to wear and vibrations without losing accuracy in repetition and is simple to manipulate. Such chucks are used in automatic tool changing systems in which the tool carrier must be able to receive different tools at short time intervals and must have a long service life and high accuracy in repetition. This is accomplished as defined in the characterizing portion of claim 1.

With the solution according to the present invention, areal contact is ensured in the region of the individual components of the chuck providing high grade damping of vibrations and at the same time low specific areal pressures.

The characterizing feature of claim 2 makes it possible to externally actuate the chuck in the radial direction from two sides. The characterizing feature of claim 3 provides that the chuck is tightened always only by one pressure screw 15 which permits the use of cost saving actuating devices for the automatic chuck.

The characterizing feature of claim 5 ensures uniformity of the clamping pressures acting from both sides on the locking element. The characterizing feature of claim 6 ensures that the locking element, if the shank is removed from the mating bore in the carrier, is automatically returned into a center position in which the extraction process is not interfered with. The characterizing feature of claim 7 ensures that the locking element is always operational with respect to the rotary position of its longitudinal axis. claim 8 ensures an economical production of the locking element and of the transverse recess.

The characterizing feature of claim 10 permits wedging of both components of the locking element within the transverse bore together with the clamping movement, which is particularly favorable for ensuring resistance to vibrations. The characterizing feature of claim 11 permits the chuck to be tightened and loosened also in the axial direction, for example, from the front of the tool. The characterizing feature of claim 14 again enhances resistance to vibrations. The characterizing feature of claim 16 permits unimpeded introduction of the shank into its mating bore without the end of the locking element, which may possibly project from the transverse recess, interfering with the insertion movement.

The further features of the invention solve problems resulting from the fact that the balls are seated in their ball seat in a freely rotational manner. If the tool is removed, this could result in a ball being rotated, for example due to external mechanical influences (vibrations, shocks and the like), into a position in which its truncation surface lies within the ball seat. If the chuck is closed, the sloped face of the locking element would then n longer be charged by the truncation surface but in a point contact by a spherical circumferential region of the ball surface. On the one hand, this would no longer ensure proper clamping of the tool in the holder; on the other hand, the danger would arise that the point-type loads would create such high local pressures on the ball surface that the ball would be destroyed.

The features of claim 17 are provided to avoid these drawbacks. Since thus, if the chuck is released, the plane of the truncation surface of the ball is automatically placed into a parallel position with the axis of the system, the truncation surface is always in front of the locking element, independently of the rotary position of the pressure screw so that unimpeded introduction of the shank and fault-free clamping of the truncation surface with the slope of the locking element are ensured. The stated rest position of the truncation surface of the ball makes it possible to release and tighten the chuck with only minimum displacement of the ball with respect to the locking element. During the clamping process itself, the charging of the truncation surface of the ball causes the sloped face of the locking element to deflect the ball from its rest position against the force of the reset element.

The characterizing feature of claim 18 defines a structurally advantageous configuration of the reset element and its attachment to the ball or pressure screw, respectively. This is particularly simple since the reset element is merely an elongate spring element—according to claim 19, an elongate coil spring—which lies over its length in two blind bores of the ball and the ball seat, respectively. Instead of a coil spring, it is also possible to employ, for example, an elongate spring-elastic plastic rod or the like.

The configuration according to claim 20 permits the ball to be deflected in all lateral spatial directions with respect to the ball seat, with a resetting force always being exerted on the ball independently of the direction of deflection. The funnel or cone-shaped widening of the two blind bores thus avoids sharp corners and edges in the region where the spring element contacts. Moreover, installation, particularly the introduction of the spring into the blind bores, is very much facilitated by this widened portion.

The measures defined in the characterizing features of claims 21 to 23 are directed toward improving the resetting moment which the spring exerts on the ball.

The configuration of the chuck as defined in claim 24 transfers to the ball without delay the resetting moment generated by the spring. Because of the alternating contact of the spring, over its entire length, in the region of the two blind bores in the ball seat and in the region of the ball, the resetting force generated by the spring is directly transferred to the ball over the entire length of the spring.

According to claim 25, the two blind bores are concentric with the rotation axis of the pressure screw and the ball, respectively. The rotation axis of the ball is here understood to be the axis passing through the center of the truncation surface and normal to that surface. The defined configuration facilitates installation. The elongate spring member need be inserted only into the blind bore of the ball and both components together are then pressed into the ball seat. The end of the spring projecting from the blind bore in the ball is then introduced in a straight line into the blind bore of the ball seat. The funnel or cone-like widening of the blind bores here has the advantage that the insertion is particularly easy.

The length of the spring defined in claim 26 again has a positive effect on the resetting moment that can be generated since this force increases with the length of the spring.

The features defined in claim 27 serve to improve the bearing characteristics of the ball in the ball seat. The openings in the two blind bores actually worsen the bearing for the ball, particularly since the opening in the blind bore in the ball is disposed on the surface section diametrally opposed to the ball truncation surface. The effective bearing surface is thus reduced primarily in those regions of the bearing in which normally the greatest bearing pressures occur. Therefore, it is of advantage for the overlap region of the openings in the two blind bores to have the minimum surface area and consequently a shape which corresponds essentially to the cross section of the spring.

BRIEF DESCRIPTION OF THE DRAWINGS

The subject matter of the invention will be described in greater detail below with reference to embodiments that are illustrated in the drawing figures, in which.

DETAILED DESCRIPTION OF THE PREFERRED EMBODIMENTS

Figure 1:
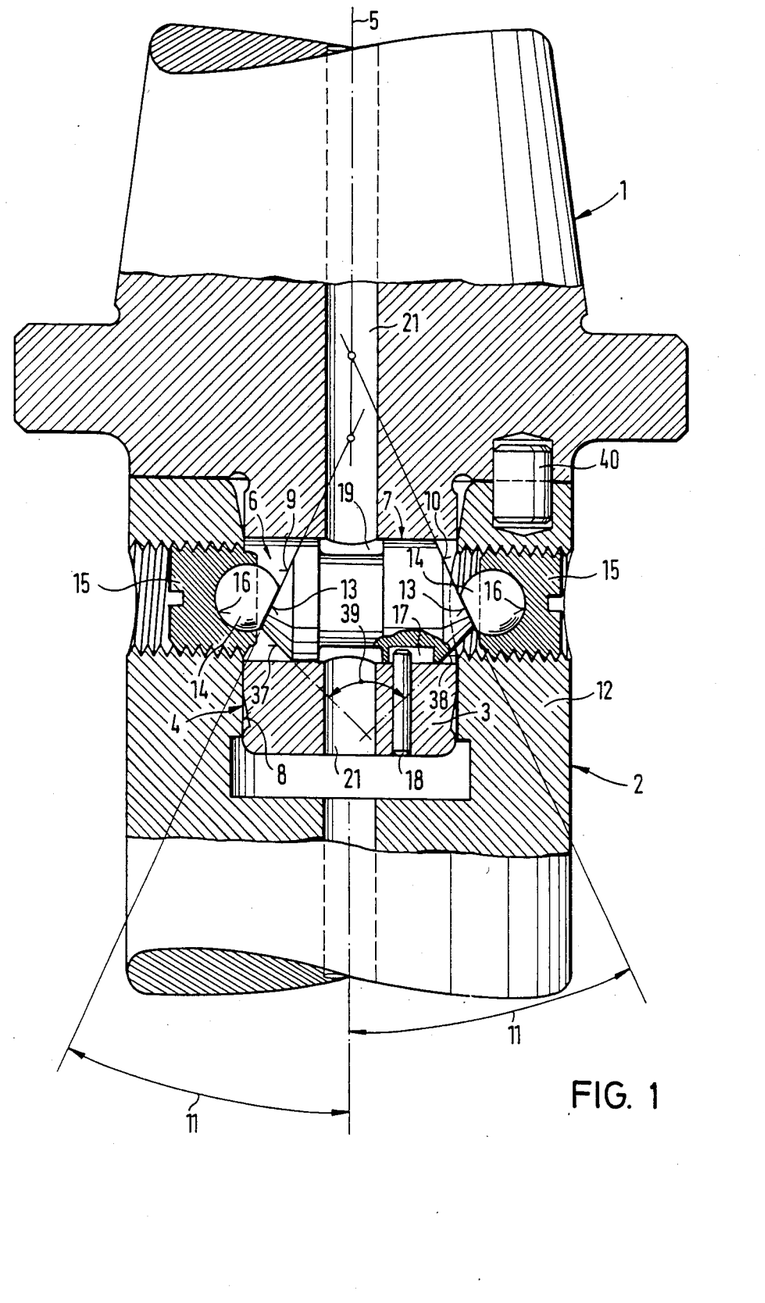
FIG. 1 is a longitudinal sectional view of a first embodiment of the invention.
Figure 2:
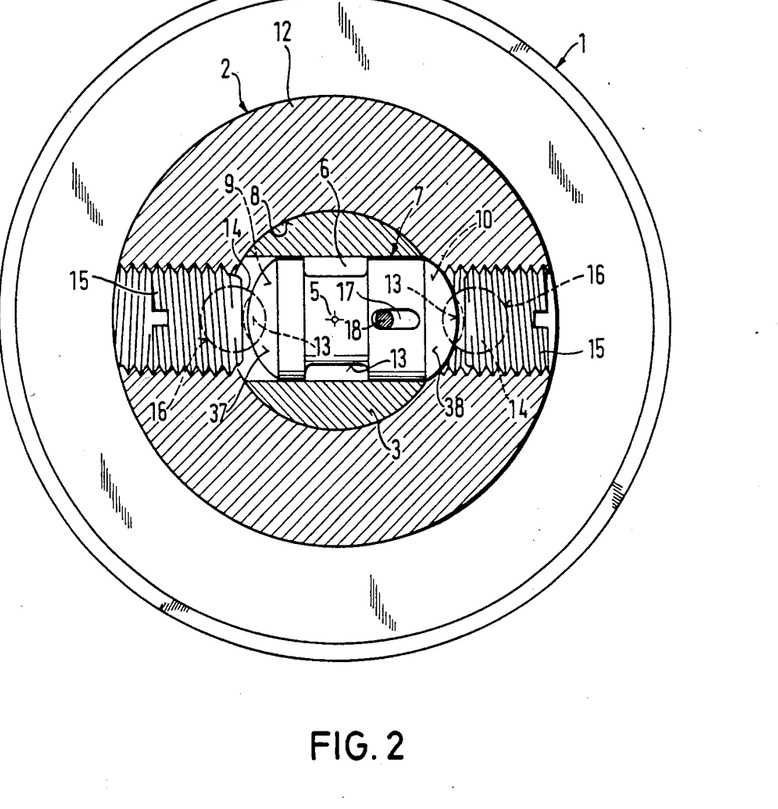
FIG. 2 is a sectional view along line II—II of FIG. 1.
Figure 3:
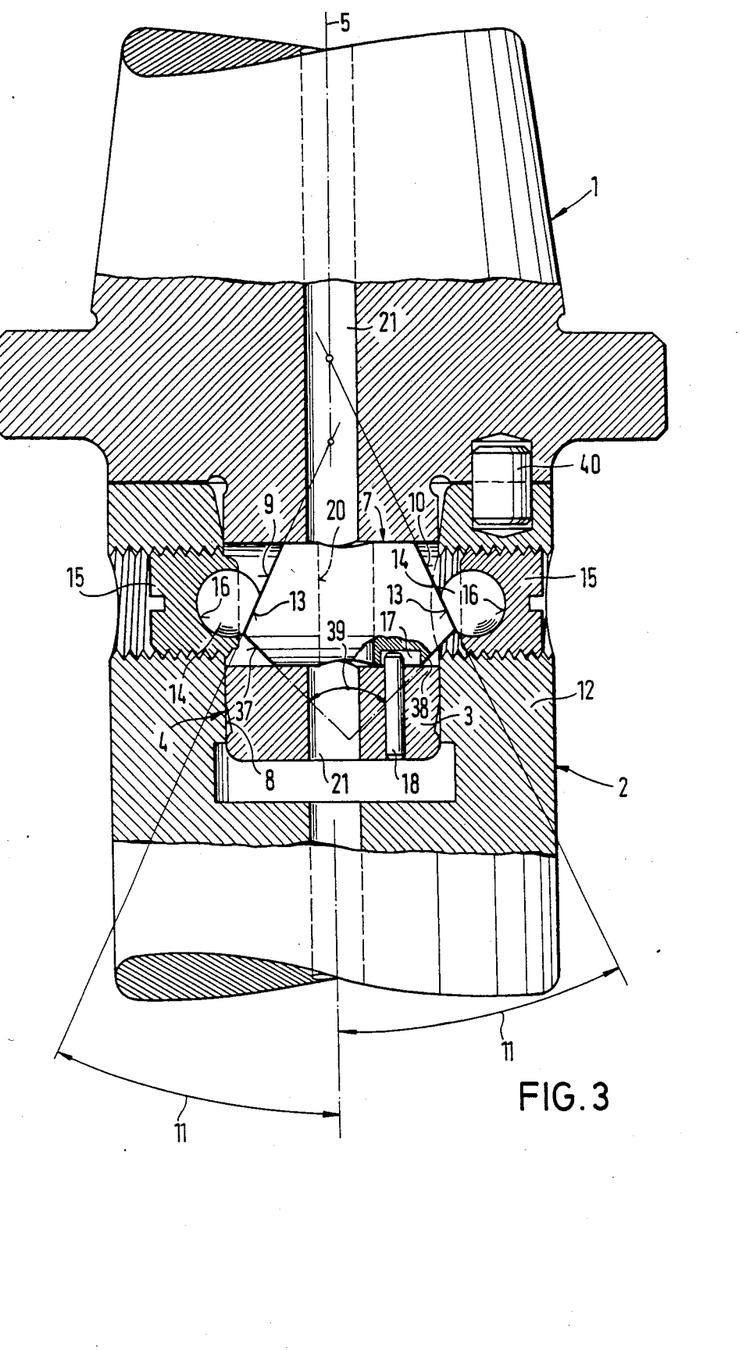
FIG. 3 is a longitudinal sectional view corresponding to FIG. 1 of an alternative embodiment of the invention.
Figure 5:
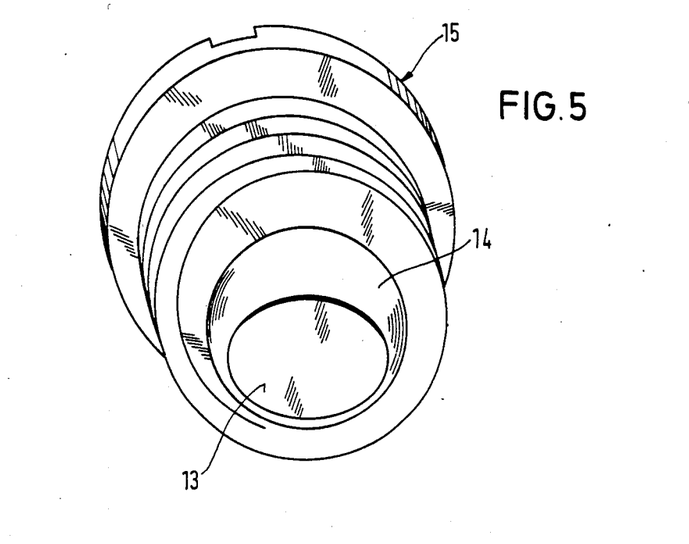
FIGS. 5 and 5a are enlarged perspective views of the pressure screws and their balls.
Figure 5A:
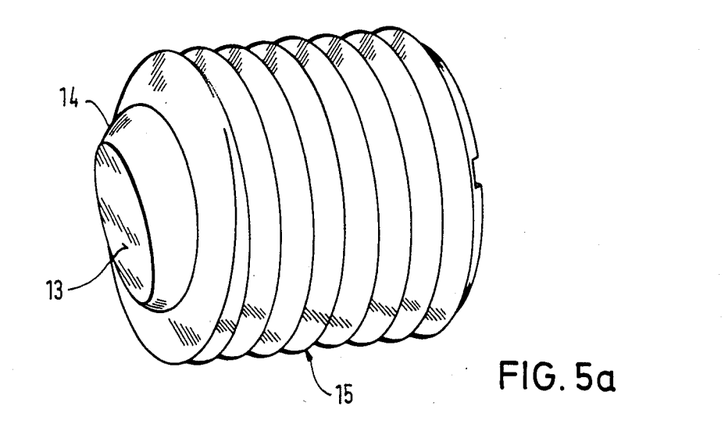

The chuck according to FIGS. 1 to 3 is essentially composed of a blade carrier, hereinafter abbreviatedly called tool 1, and the carrier 2, e.g. the drive spindle of a machine tool. Tool 1 has a rear shank 3 which is inserted into a coaxial mating bore 4 in carrier 2 and is there fixed by blocking members against axial movement in the direction of system axis 5 as well as against rotary movement about system axis 5. The blocking member is here at least one locking element 7 which is radially displaceable in a continuous radial transverse recess 6 in shank 3. At each of its two frontal ends facing inner wall 8 of bore 4, locking element 7 is provided with a planar sloped face 9, 10 which forms an acute angle 11 that closes in the direction toward tool 1 with system axis 5. Each sloped face 9, 10 is charged by the pressure face of a pressure element which is screwed into an annular flange 12 radially surrounding bore 4. This pressure face is the truncation surface 13 of a ball 14. An area of each ball 14, when seated in a ball seat 16, is supported on the front end of a pressure screw 15 which is screwed radially through the annular flange from the outside and is thus held captive in seat 16 (FIGS. 5, 5a).

The angles 11 enclosed by the two sloped faces 9 and 10 with the axis of bore 4 and system axis 5, respectively, are identical.

The displacement of locking element 7 is limited in the longitudinal direction of transverse recess 6 so that only one of its sloped faces 9 or 10, respectively, is able to radially project beyond shank 3. For this purpose, a longitudinal groove 17 of limited length is disposed at the outer circumference of locking element 7, with a pin 18 fixed to shank and oriented in the direction of system axis 5 projecting into this groove. Contact with the ends of longitudinal groove 17 effects the limitation of the displacement path. Additionally, locking element 7 is guided in transverse recess 6 without being able to rotate. Transverse recess 6 may be a bore and locking element 7 a cylindrical pin.

In its center, locking element 7 is provided with an annular groove 19, or a through bore 20 passes through it in the longitudinal direction of system axis 5. This through bore 20 is in congruence with an axial coolant bore 21 in shank 3.

Figure 4:
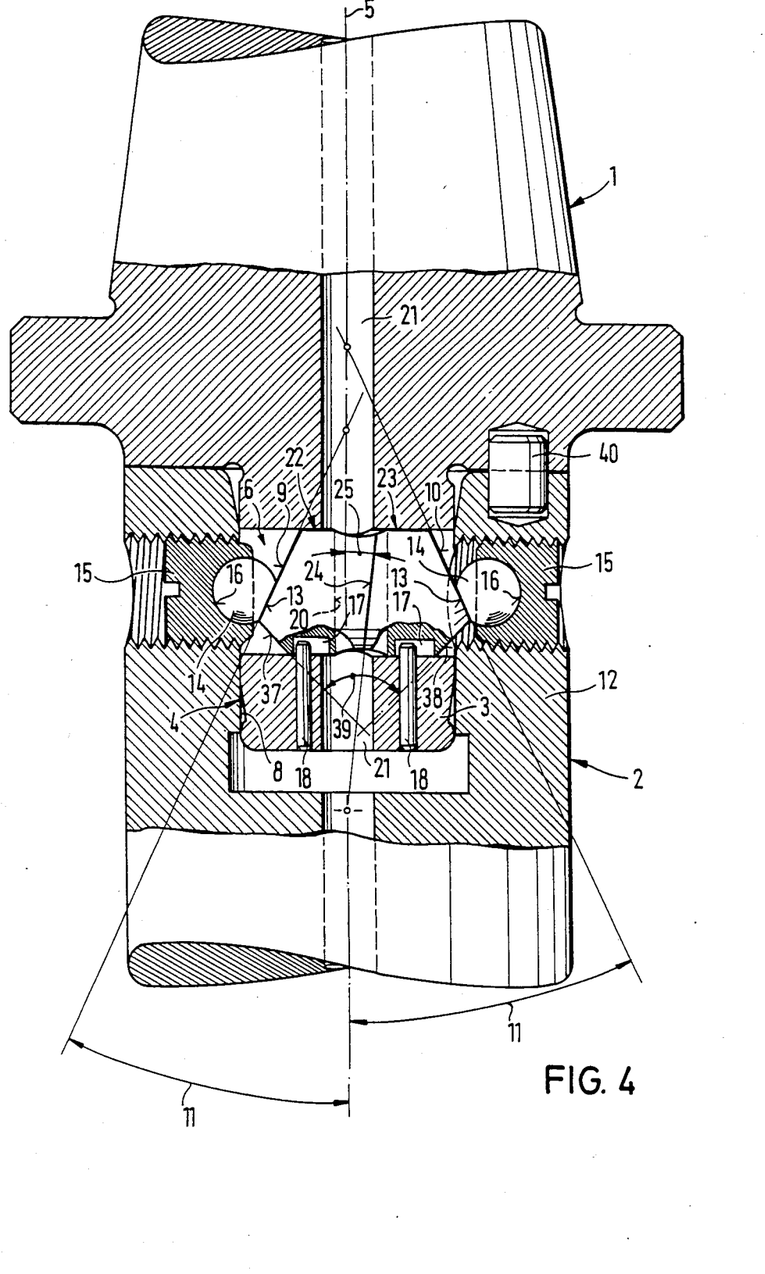
FIG. 4 is a longitudinal sectional view of a further embodiment in which the locking element is made of two parts in the form of two partial components.

In the embodiment according to FIG. 4, the locking element is made of two parts, with each component 22, 23 having an associated sloped face 9, 10 and the dividing planes 24 of both components 22, 23 form an acute angle 25 with the system axis 5 and with the longitudinal axis of bore 4, respectively and lie next to one another.

Figure 6:
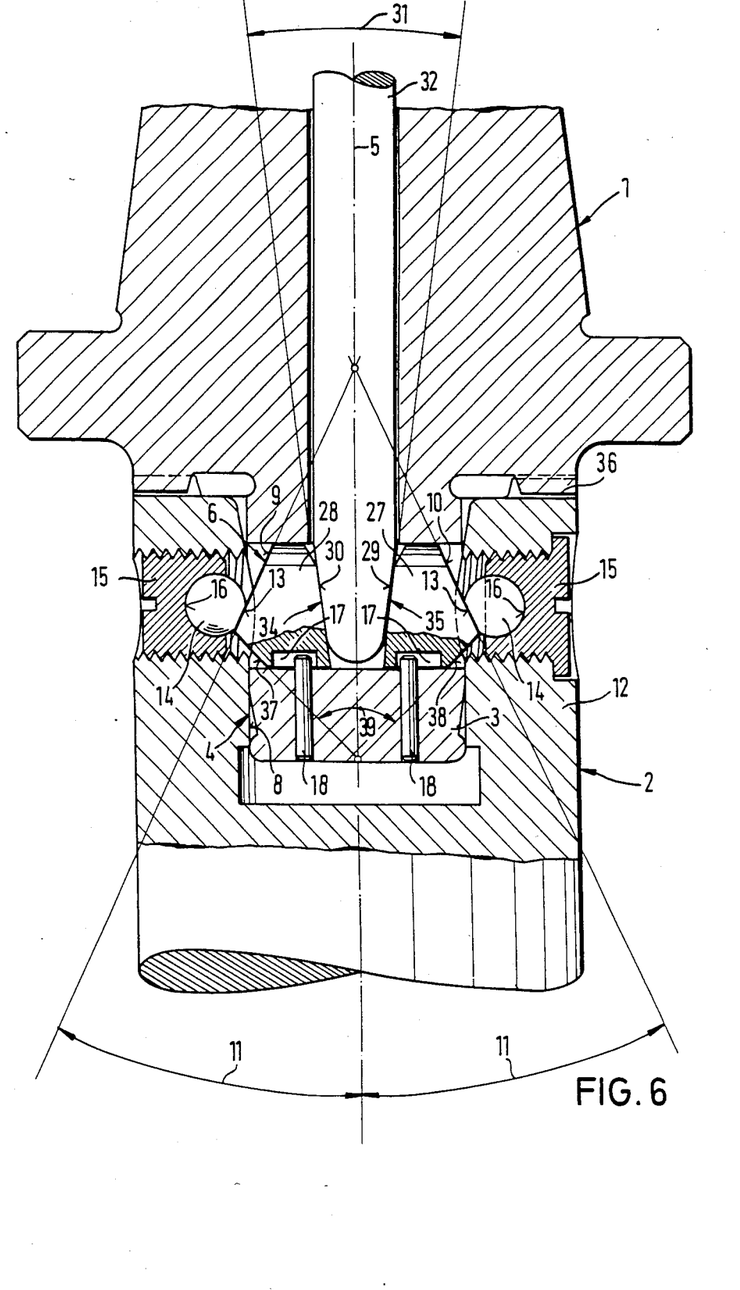
FIG. 6 shows an embodiment of a chuck which can be actuated axially from the side of the tool.

In the embodiment according to FIG. 6, the locking element is also made of two parts. It is composed of components 27 and 28 whose mutually facing dividing faces 29, 30 form an acute angle 31 which opens in the direction toward tool 1. The dividing faces 29, 30 of components 27, 28 can be spread apart by a clamping member 32 which is driven to be longitudinally displaceable in the direction of system axis 5.

In the case of the embodiment according to FIG. 6, wedge faces 34, 35 of clamping member 32 lie in the same plane on mutually facing dividing faces 29, 30 of locking elements 27, 28. The wedged intermediate position of clamping member 32 between locking elements 28, 29 may be self-locking; in that case, sufficient pressure must be available to retract clamping member 32 from its locked position.

In the embodiment according to FIG. 6, an additional blocking member is provided to prevent rotary movement. This is a Hirth serration 36 which is disposed in the region of the axial contact face between annular flange 12 of carrier 2 and the counterface of tool 1.

On their side facing away from tool 1, the frontal ends of locking element 7 and of components 22, 23 and 27, 28, respectively, are provided with counterslopes 37, 38 which preferably form an acute angle 39 opening in the direction toward the tool. During introduction of shank 3, counterslopes 37, 38 push locking element 7 into its center position.

In the embodiment according to FIGS. 1 to 4, the chuck is tightened by screwing in at least one of the two pressure screws 15 from the outside of carriers 2. This causes the truncation faces 13 of balls 14 to be placed against the sloped faces 9, 10 of locking element 7 or components 22, 23 (FIG. 4) and 27, 28 (FIG. 6), respectively, and thus generate an axial pressure on shank 3 in the direction toward the interior of mating bore 4. The security against rotation between carrier 2 and tool 1 can be improved by a shank 40 (FIGS. 1, 3 and 4) or by a Hirth serration (planar notch serration) 36 (FIGS. 6 to 9) effective in the region of the axial contact face between annular flange 12 of carrier 2 and the counterface of tool 1. Loosening of the chuck is possible by releasing pressure screw 15 which had previously been tightened. Due to the sloped faces 9, 10, removal of shank 3 from mating bore 4 causes locking element 7 or its components 22, 23, respectively, to automatically move back into a centered position in transverse recess 6 in which it can be removed without difficulty.

In the case of the embodiment of FIG. 6, tightening and releasing can be effected, other than by tightening both pressure screws 15, also by advancing and retracting clamping member 32.

If, above, it was mentioned that shank 3 is connected with tool 1 and mating bore 4 is part of carrier 2, a kinematically reversed association of shank 3 and mating bore 4 is also possible without changing the idea of the invention. In any case, the invention enhances a short structure of the chuck in the direction of system axis 5.

Figure 8:
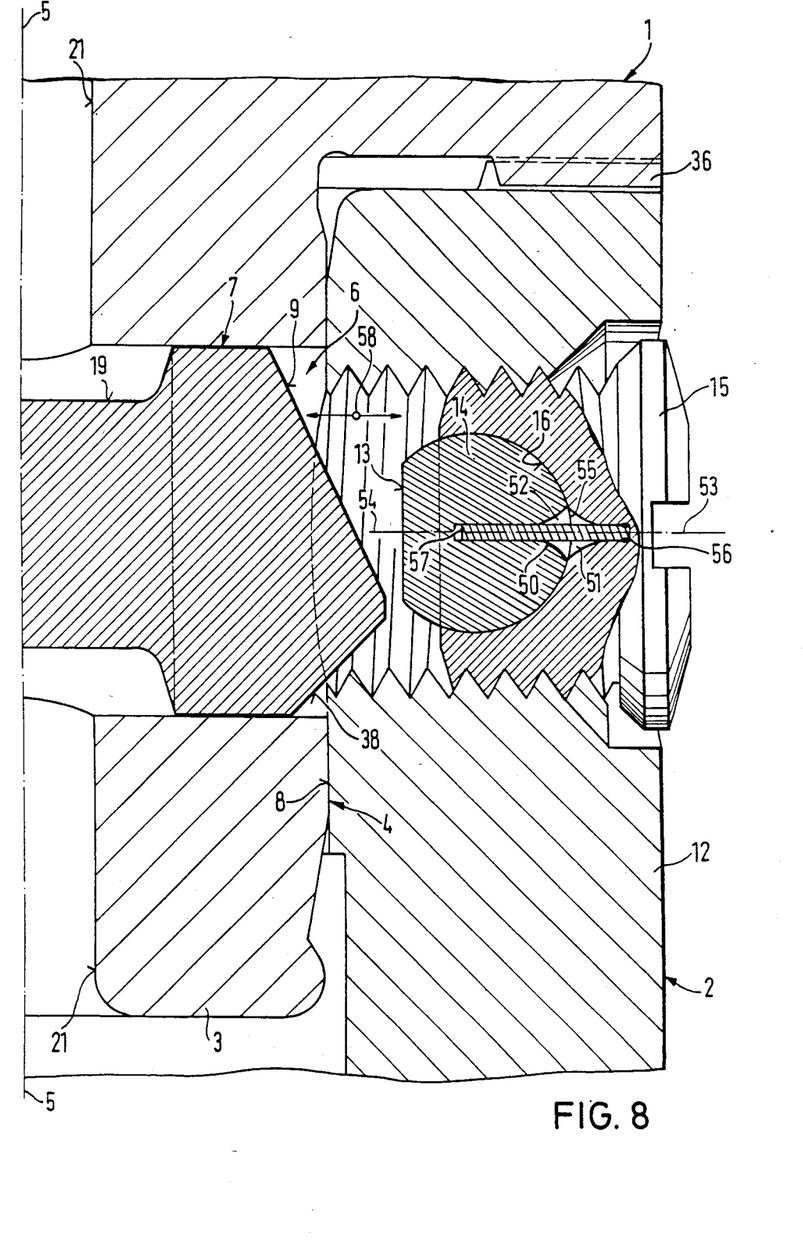
FIG. 8 is a longitudinal sectional detail view of FIG. 7 through the chuck in its released rest position.
Figure 9:
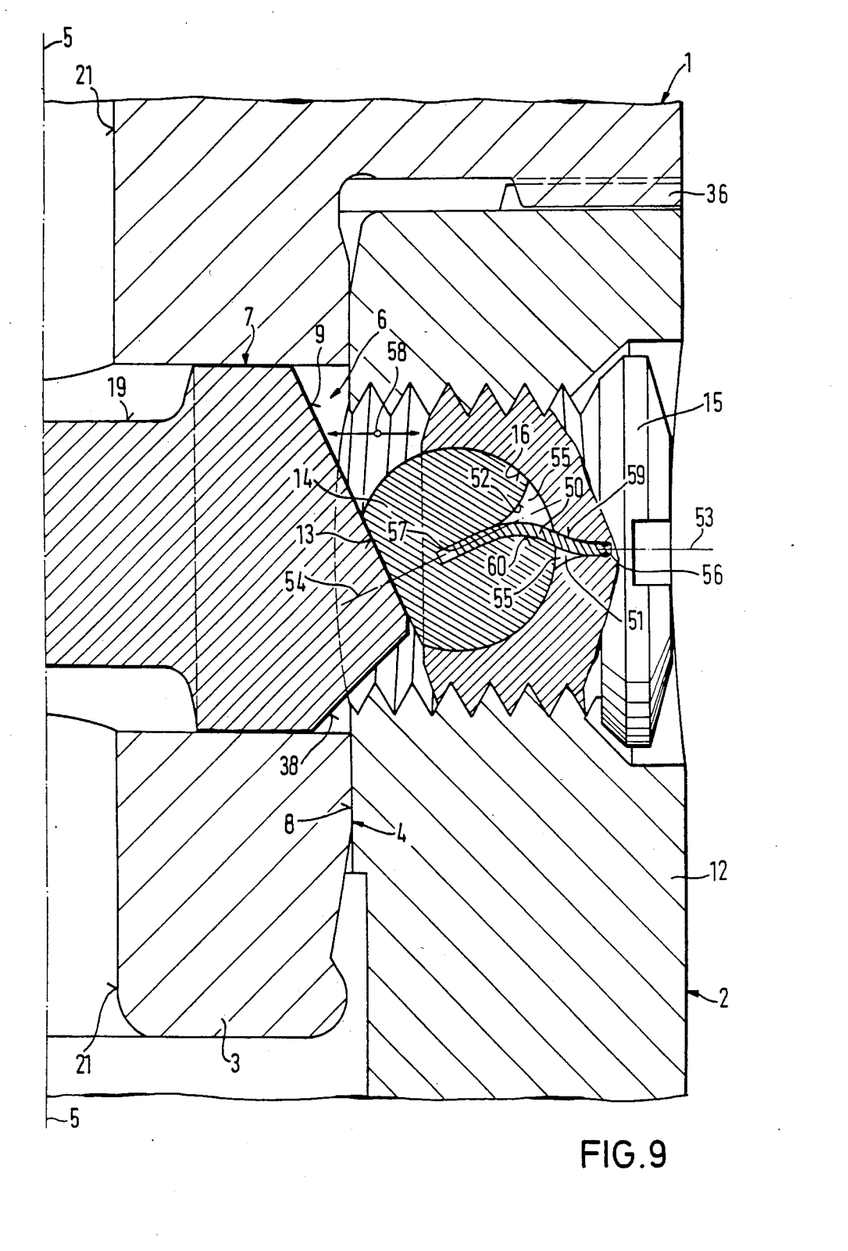
FIG. 9 is a longitudinal sectional detail view analogous to FIG. 8 through the chuck in its tightened position.

Between balls 14 and their associated pressure screw 15, a device is effective which, when pressure screw 15 is released, brings balls 14 back into a starting position in which the truncation face 13 is oriented parallel to system axis 5. This resetting device, which is shown particularly in FIGS. 8 and 9, is composed of an elongate coil spring 50 which rests over its length in two blind bores 51, 52 in bearing seat 16 of pressure screw 15 or of ball 14, respectively. The two blind bores 51, 52 are each concentric with the rotation axes 53, 54 of pressure screw 15 and ball 14, respectively. The rotation axis 54 of ball 14 is the axis passing through the center of truncation surface 13 and disposed at a right angle thereto. Moreover, the two blind bores 51, 52 are configured to become wider in the manner of a funnel in the direction of their openings 55. At their bottom, the diameter of blind bores 51, 52 corresponds to that of coil spring 50. As can be seen from a comparison between FIGS. 8 and 9, coil spring 50 is fixed at its end 56 on the side of the pressure screw in blind bore 52, for example by means of an adhesive. Of course, the fixing may also be reversed and may be applied at the other end. The end 57 on the side of the ball rests freely in blind bore 51. As can be seen in FIG. 8, the length of coil spring 50 essentially corresponds to the sum of the depth of the two blind bores 51, 52.

The truncation surface 13 of ball 14 faces slope 9, with truncation surface 13 being oriented at a right angle to the direction 58 of relative displacement and parallel to system axis 5. The openings 55 of both blind bores 51, 52 are congruent. The chuck is closed by screwing in at least one of the two pressure screws 15 from the exterior of carrier 2. This causes the truncation faces 13 of balls 14 to lie against the slopes 9 of locking element 7 and thus generate an axial pressure on shank 3 in the direction toward the interior of bore 4. If ball 14 is deflected with respect to ball seat 16, coil spring 50 is deformed in both blind bores 51, 52 and, in particular, is deflected laterally. This causes coil spring 50 to generate a resetting force since it has a tendency to expand. If the chuck is released again by relative displacement of locking element 7 with respect to ball 14, contraction of coil spring 50 causes ball 14 to be set back into the rest position shown in FIG. 2 in which its truncation face 13 is disposed at a right angle to the direction 58 of relative displacement and parallel to system axis 5, respectively. As can be seen in FIG. 9, if ball 14 and locking element 7 are in the clamping position, coil spring 50 lies over its entire length in the region of the two blind bores 51, 52 against alternating facing side walls 59, 60 of both blind bores 51, 52. In this case, openings 55 of the two blind bores have an overlap region whose area and shape correspond essentially to the cross section of coil spring 50.

The present disclosure relates to the subject matter disclosed in German Applications Nos. P 36 44 091.4 of Dec. 23, 1986, P 37 16 932.7 of May 20, 1987 and P 37 34 699.7 of Oct. 14, 1987, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. A chuck for clamping tools (1) into a carrier (2) particularly in a revolving head or into the drive spindle of a machine tool,
    wherein the tool (1) has a rearward shank (3) which is inserted into a mating bore (4) in the carrier (2), with said bore being surrounded by an annular flange (12) and including the system axis (5) as the bore axis and said shank is fixable therein by means of blocking members, for which purpose a locking element (7) is provided whose frontal ends have sloped faces (9, 10) and which is mounted in a continuous, radial, transverse recess (6) of the shank (3) so as to be radially displaceable therein; said two sloped faces (9, 10)
    form an acute angle (11) with the system axis (5), said angle closing in the direction toward the tool (1) to be clamped in; and
    are charged for clamping by balls (14) which are held at an annular flange (12) so as to be non-displaceable in the axial direction but radially movable, characterized in that
    a planar truncation surface (13) of each ball (14) charges the slopes (9, 10) of the locking element (7) with each ball being rotatably supported in a ball seat (16), with at least one ball (14) being disposed at the frontal end of a pressure screw (!5) which is screwed from the exterior radially through the annular flange (12) and is there held captive (FIGS. 1, 2).

2. A chuck according to claim 1, characterized in that each ball (14) is disposed at the frontal end of a pressure screw (15) which is screwed in from the exterior radially through the annular flange (12).

3. A chuck according to claim 2, characterized in that one of the two pressure screws (15), when in the screwed-in position, is connected with the annular flange (12) in a substance connecting manner, particularly by way of an adhesive.

4. A chuck according to claim 1, characterized in that the pressure screw (15) is a threaded pin which is insertable into the circumferential face of the annular flange (12).

5. A chuck according to claim 1, characterized in that the two angles (11) formed by the two slopes (9, 10) with the system axis (5) are identical.

6. A chuck according to claim 5, characterized in that the locking element (7) is limited in its displacement in the longitudinal direction of the transverse recess (6) in that it is able to protrude radially beyond the shank (3) only with one slope (9 or 10).

7. A chuck according to claim 6, characterized in that the locking element (7) is mounted in the transverse recess (6) to be secure against rotation but displaceable in the radial direction.

8. A chuck according to claim 7, characterized in that the transverse recess (6) is a bore and the locking element (7) is a cylindrical pin.

9. A chuck according to claim 1, characterized in that the locking element (7) is provided with an annular groove (19) in its center or is radially penetrated by a through bore (20) which is in congruence with an axial coolant bore (21) in the shank (3) (FIGS. 1, 3).

10. A chuck according to claim 1, characterized in that the locking element (7) is divided into two parts, with each component (22, 23) having an associated slope (9, 10) on its exterior and the dividing planes (24) of both components (22, 23) form an acute angle (25) with the longitudinal axis (5) of the bore (4) and lie next to one another (FIG. 4).

11. A chuck according to claim 1, characterized in that the locking element (7) is divided into two parts and the facing dividing faces (29, 30) form an acute angle (31) with one another and can be spread apart by a wedge-shaped clamping member (32) which is longitudinally displaceable in the axial direction of the shank (3).

12. A chuck according to claim 11, characterized in that the dividing faces (29, 30) form an acute angle (31) with one another which opens in the direction toward the tool (1).

13. A chuck according to claim 11, characterized in that the wedge faces (34, 35) of the clamping member (32) lie in the same plane and on the mutually facing dividing faces (29, 30) of the locking elements (27, 28) (FIG. 6).

14. A chuck according to claim 11, characterized in that the clamping member (32) is self-locking in an intermediate, wedged position between the locking elements (28, 29).

Figure 7:
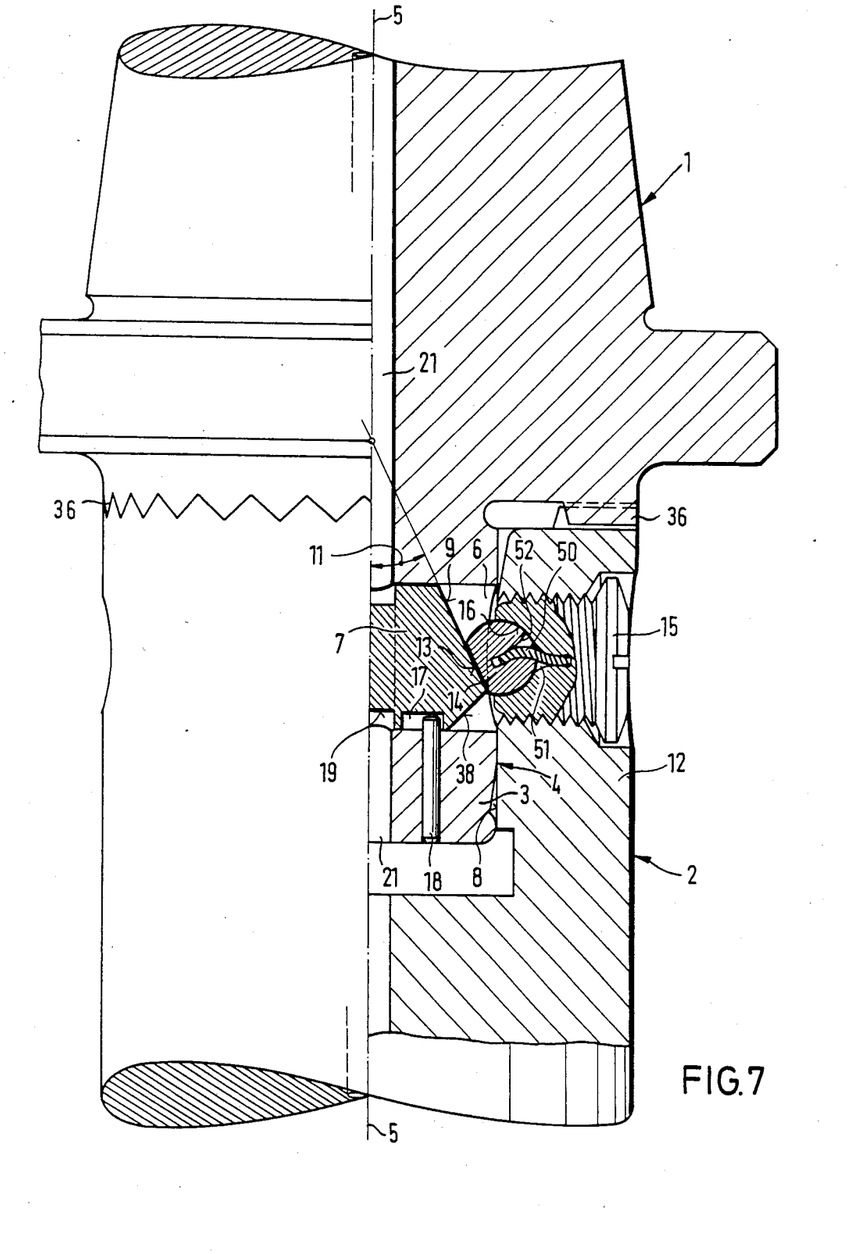
FIG. 7 is a side view, partially in longitudinal section, of the chuck equipped with resettable balls.

15. A chuck according to claim 1, characterized in that a Hirth serration (planar notch serration) (36) is provided in the region of the axial abutment face between the annular flange (12) of the carrier (2) and the counterface of the tool (1) to fix the chuck against relative rotation (FIG. 7).

16. A chuck according to claim 1, characterized in that the front ends of the locking element (7) and of the components (22, 23; 27, 28), of the locking element, respectively, on their side facing away from the tool, are provided with counterslopes (37, 38) which open in the direction toward the tool (1) (FIGS. 1, 3, 4, 6).

17. A chuck according to claim 1, characterized in that a spring-elastic reset element is active between pressure screw (15) and ball (14) which, with the chuck in the released state, aligns the ball (14) so that the plane of its truncation face (13) is approximately parallel to the system axis (5) (FIGS. 7, 8, 9).

18. A chuck according to claim 17, characterized in that the reset element is an elongate spring member (50) which, under bending stress, generates a resetting force in the direction of its expansion, each of the two ends of said reset element lying in a blind bore (51, 52) of the ball (14) and of the ball seat (16), said bores opening into one another in a coaxial manner when the ball (14) is in the rest position.

19. A chuck according to claim 18, characterized in that the spring element (50) is a coil spring.

20. A chuck according to claim 18, characterized in that the two blind bores (51, 52) become wider in the manner of a funnel or a cone in the direction of their openings (55).

21. A chuck according to claim 20, characterized in that in the tightened position, the spring member (50) lies, over its entire length, in the region of the two blind bores (51, 52), against alternating facing side walls (59, 60) of the two blind bores (51, 52).

22. A chuck according to claim 18, characterized in that the diameter of the blind bores (51, 52) at the bottom of the bore approximately corresponds to the diameter of the spring member (50).

23. A chuck according to claim 18, characterized in that the spring member (50) is fixed at one of its ends (56, 57) in a corresponding blind bore (51, 52).

24. A chuck according to claim 18, characterized in that the spring member (50) is fixed at one of its ends (56, 57) in the respective corresponding blind bores (51, 52).

25. A chuck according to claim 18, characterized in that the two blind bores (51, 52) extend concentric to the rotation axis (53, 54) of the pressure screw (15) or the ball (14), respectively.

26. A chuck according to claim 18, characterized in that the length of the spring member (50) essentially corresponds to the sum of the depths of the two blind bores (51, 52).

27. A chuck according to claim 18, characterized in that, with the ball (14) in the deflected clamping position, the openings (55) in the two blind bores (51, 52) have an overlap region whose area and shape essentially correspond to the cross section of the spring member (50).

* * * * *